US012759515B2

(12) United States Patent
Zaidi et al.

(10) Patent No.: US 12,759,515 B2
(45) Date of Patent: Oct. 13, 2026

(54) BRAKING DEVICE TO SECURE MOBILE UNITS

(71) Applicant: THE ABRAZA GROUP LLC, Barrington, IL (US)

(72) Inventors: Rayan Raza Zaidi, Barrington, IL (US); Aidan Raza Zaidi, Barrington, IL (US); Asim Raza Zaidi, Barrington, IL (US); Batool Zehra Zaidi, Barrington, IL (US)

(73) Assignee: The ABRAZA Group, LLC, Barrington, IL (US)

( * ) Notice: Subject to any disclaimer, the term of this patent is extended or adjusted under 35 U.S.C. 154(b) by 364 days.

(21) Appl. No.: 18/405,715

(22) Filed: Jan. 5, 2024

(65) Prior Publication Data

US 2024/0300454 A1 Sep. 12, 2024

Related U.S. Application Data

(60) Provisional application No. 63/451,293, filed on Mar. 10, 2023.

(51) Int. Cl.
*B60T 3/00* (2006.01)
*B60R 25/09* (2013.01)
*B62B 5/04* (2006.01)

(52) U.S. Cl.
CPC .............. *B60T 3/00* (2013.01); *B60R 25/093* (2013.01); *B62B 5/049* (2013.01)

(58) Field of Classification Search
CPC .......... B60T 3/00; B60R 25/093; B62B 5/049
See application file for complete search history.

(56) References Cited

U.S. PATENT DOCUMENTS 1,353,541 A * 9/1920 Retterer ................ B60R 25/093 70/18
1,379,423 A * 5/1921 Trimm .................. B60R 25/093 482/61
2,773,564 A * 12/1956 Helen ........................ B60T 3/00 D12/217

(Continued)

FOREIGN PATENT DOCUMENTS

CN 206260172 U 6/2017
CN 212347475 U 1/2021

(Continued)

*Primary Examiner* — Bradley T King
(74) *Attorney, Agent, or Firm* — Thompson Coburn LLP

(57) ABSTRACT

A braking device is disclosed that may contain a plurality of braking members. The plurality of braking members may be removably attachable to one another to create a confinement zone in an assembled configuration of the braking device. A frictional material may also be coupled to at least a portion the plurality of braking members to help secure a surface placement of the braking device when in the assembled configuration. In the assembled position, the braking device may enclose a moveable component of a mobile unit. The moveable component of the mobile unit may be located within the confinement zone in which it can be secured or locked positionally from further movement by the braking device. The braking device may further contain a biasing mechanism that may be movable within a portion of confinement zone to engage with and secure the movement component by the braking device.

19 Claims, 10 Drawing Sheets

(56) References Cited

U.S. PATENT DOCUMENTS

| | | | | | |
|---|---|---|---|---|---|
| 2,844,909 | A * | 7/1958 | Perchinsky | A47B 91/12 | 248/346.11 |
| 3,551,001 | A | 12/1970 | Wilson | | |
| 4,049,295 | A * | 9/1977 | Piers | F16L 37/004 | 285/332 |
| 5,147,019 | A | 9/1992 | Van Hooreweder et al. | | |
| 5,343,988 | A | 9/1994 | Bartsch et al. | | |
| 5,375,442 | A * | 12/1994 | Hammer | B60R 25/093 | 70/226 |
| 5,479,794 | A * | 1/1996 | Rains | B62B 5/049 | 188/4 R |
| 5,513,727 | A * | 5/1996 | Belanger | B60T 3/00 | 188/32 |
| 5,628,212 | A * | 5/1997 | Fritzler | B60R 25/093 | 70/226 |
| 5,873,275 | A | 2/1999 | Lukich | | |
| 6,116,062 | A * | 9/2000 | Markegard | B60R 25/093 | 70/237 |
| 6,119,992 | A * | 9/2000 | Stuart | G09F 15/00 | 248/231.71 |
| 7,594,415 | B1 * | 9/2009 | Wu | B60R 25/093 | 70/226 |
| 7,793,987 | B1 * | 9/2010 | Busch | A61M 16/161 | 285/9.1 |
| 9,049,908 | B2 | 6/2015 | Jiang | | |
| 9,216,754 | B2 | 12/2015 | Chen | | |
| 10,035,499 | B2 * | 7/2018 | Lovelady | B60T 3/00 | |
| 10,602,822 | B1 | 3/2020 | Wang | | |
| 11,999,330 | B2 * | 6/2024 | Dando | E05B 73/00 | |
| 12,552,548 | B2 * | 2/2026 | Talapureddi | B60T 3/00 | |
| 2004/0140602 | A1 | 7/2004 | Gerritsen et al. | | |
| 2006/0081025 | A1 * | 4/2006 | Smith | B60R 25/093 | 70/226 |
| 2009/0146412 | A1 * | 6/2009 | Schoenoff | F16L 37/004 | 285/306 |
| 2010/0108448 | A1 * | 5/2010 | Wyers | B60T 3/00 | 70/226 |
| 2011/0031082 | A1 | 2/2011 | Chi | | |
| 2011/0083481 | A1 * | 4/2011 | Cheatham | B60R 25/093 | 188/32 |
| 2011/0240416 | A1 * | 10/2011 | Brooks | B60T 3/00 | 188/32 |
| 2011/0247377 | A1 * | 10/2011 | Wu | B60R 25/093 | 70/226 |
| 2012/0160617 | A1 | 6/2012 | Qi et al. | | |
| 2014/0299431 | A1 | 10/2014 | Lusson | | |
| 2015/0033614 | A1 * | 2/2015 | Allbright, Jr. | A01M 23/18 | 43/60 |
| 2015/0343938 | A1 * | 12/2015 | Graham | B60P 3/077 | 410/3 |
| 2017/0120401 | A1 * | 5/2017 | Fullerton | B23P 15/001 | |
| 2018/0056948 | A1 * | 3/2018 | Lovelady | B60T 3/00 | |
| 2018/0186346 | A1 * | 7/2018 | Tullo | B60S 9/04 | |
| 2020/0292114 | A1 * | 9/2020 | Liu | F16M 13/022 | |
| 2021/0024042 | A1 * | 1/2021 | Dando | E05B 73/00 | |
| 2021/0046908 | A1 * | 2/2021 | Omran | B62B 5/049 | |
| 2022/0396239 | A1 * | 12/2022 | Clarke | B60R 25/093 | |
| 2023/0021747 | A1 * | 1/2023 | Armstrong | B60R 19/54 | |
| 2023/0072634 | A1 * | 3/2023 | Fortune | H05K 7/20727 | |
| 2023/0278525 | A1 * | 9/2023 | Hardin | B60T 3/00 | 70/259 |
| 2023/0286474 | A1 * | 9/2023 | Barneycastle | B60T 3/00 | |
| 2025/0249863 | A1 * | 8/2025 | Lawal | B60R 25/093 | |

FOREIGN PATENT DOCUMENTS

| | | | |
|---|---|---|---|
| EP | 2908689 | A1 | 8/2015 |
| KR | 20200001451 | U | 7/2020 |
| WO | 200921146 | A1 | 2/2009 |
| WO | 2014166144 | A1 | 10/2014 |
| WO | 202100438 | A1 | 1/2021 |

* cited by examiner

BRAKING DEVICE TO SECURE MOBILE UNITS

CROSS-REFERENCE AND PRIORITY CLAIM TO RELATED PATENT APPLICATIONS

This US non-provisional patent application claims priority to U.S. provisional patent application No. 63/451,293, filed Mar. 10, 2023, and titled "Universal Caster Brake Clamp," the entire disclosure of which is incorporated herein by reference.

BACKGROUND OF THE INVENTION

The present disclosure generally relates to the field of braking devices employed to limit movement of mobile units. More particularly, the present disclosure relates to a braking device configured to apply a braking force when used with movement components that may be present on a mobile unit. Further, the disclosed braking device may have universal applicability to secure or limit movement of multiple different types of movement components that may be present on numerous types of mobile units.

The movement of goods between multiple locations is a necessary part of both personal and professional services. To facilitate movement of goods or products, many of these mobile type units contain a movement feature such as, but not limited to, wheels. While these wheels provide for the translocational movement between positions, secondary components are usually employed to limit or cease any undesired movement. For larger mobile units such as automobiles, trucks, construction machines, or bicycles, these secondary components usually include a braking system as part of the mobile unit. These braking systems work in conjunction with the movement features, like wheels, to begin, limit, and cease movement of based on the wishes of the operational user.

There also exists many smaller types of mobile units that contain movement features but do not contain a secondary braking system. For example, shopping carts, transportation carts, personal luggage, and some medical units may all require translocational abilities, but do not have any type of dedicated braking system or components used to end any movements by the unit's operator. Usually, the end user will simply use personal force to push or pull these movable units from a beginning location to a desired end location. Upon reaching the desired end location, the end user will then simply apply personal force to terminate any further movement of these smaller units. The movement feature of many of these smaller mobile units may include a wheel or a caster. A caster (or castor) is an undriven wheel that is designed to be attached to the bottom of a larger object, to enable that object to be moved.

These lower quality, inexpensive casters used on some smaller mobile units may include a brake feature, which prevents the wheel from moving. This is commonly achieved using a lever that presses a brake cam against the wheel. Not only can a caster move in a linear direction, rotational movement of a caster can also be possible so that the direction of the linear movement can be quickly adjusted or changed by the end user. These parts may be known as a swivel caster. A swivel caster in addition to linear movement, can also move in a small circle rotating around an offset distance between the vertical shaft and the center of the wheel in either a locked or unlocked orientation.

Other types of mobile units may employ the use of a more complex type of swivel caster, sometimes called a total lock caster. A total lock caster has an additional rotational lock on the vertical shaft so that neither shaft swiveling nor wheel rotation can occur to provide rigid support to the entire unit. Other mobile units may use these two different types of locking features together or separately. If the vertical shaft is locked but the wheel can still turn, the caster becomes a directional caster, but one which may be locked to roll in one direction along any horizontal axis.

Further, smaller mobile units may provide the ability to brake or lock all casters, associated with these products at the same time. This may be accomplished with a central lock mechanism engaged by a rigid ring encircling each swivel caster, slightly above the wheel, that lowers and presses down on the wheel, preventing both wheel and swivel rotation. Other locking options involve using the central lock caster, which has a rotating cam in the center of each vertical caster shaft, leading down to a braking mechanism in the bottom of each caster.

While some of these smaller mobile units with casters have braking features, the promised functional advantages of offering a mobile unit with braking capabilities may instead result in unnecessary complications. Each of the above example braking options used with caster wheels are low tech solutions of a movable unit component. Cost is an additional factor suppliers consider in creating many of these smaller mobile units and their moveable casters when they are employed on transportation carts or personal luggage. To create a competitive product at the most optimal profit margins, both the moveable casters and any associated braking system are commonly produced with the most cost-effective materials to ensure a profitable product for the supplier. Thus, the quality and continued functional operation of these casters and braking systems above are not usually made of premium materials and rigorously tested to ensure long term use without failure.

With manufacturing cost considerations leading to lower quality materials used with the casters and any associated braking systems, failure of either the casters and braking system components are commonplace and a high area of frustration to end users. Casters can easily become detached from any connection to the smaller mobile unit or seize up preventing seamless movement in any or certain directions. Moreover, while the above braking systems may be used with these casters, they also add additional lower cost components into the movement system that are prone to failure. For example, locking type levers or movement restricting pieces that are part of the braking system may break or become stuck. In these example situations, movement of the associated caster may be compromised, limited, or even unavailable. To the end user, the desired braking feature originally viewed as a positive for purchasing or using a particular manufacturer's mobile unit can quickly become a frustration and disadvantage if they fail. Thus, the addition of these additional braking system components is known to present additional issues and points of failure. In many instances, repair of these failures is not available to the end user as it is more cost prohibitive than simply purchasing a new similar mobile type unit. The inventors, recognizing these existing issues, have developed a solution to these types of smaller mobile units having caster wheels. Further, the inventors' solution looks to address braking of multiple different type of mobile units including those with and without use of a caster wheel. The above braking systems only work with specific individual types of caster designs. They do not work universally for all different caster designs and for units that may employ different forms for movement. Thus, the inventors envision a universal braking system solution. Such a universal braking device would not require the end user to individually engage any existing braking feature on each caster, wheel, or movement feature. Additionally, the envisioned universal braking device does not add to the complexity of the existing product and is a stand alone feature to address the common failure points in existing marketplace offerings.

Further features and advantages of the disclosed embodiments, as well as the structure and operation of various elements of the disclosed embodiments, are described in detail below with reference to the accompanying drawings.

SUMMARY OF THE INVENTION

In view of the above, a braking device and method of use is provided. The braking device having a first braking member, a second braking member, a frictional material coupled to at least a portion of either the first braking member or the second braking member, a confinement zone to house a movement component of a mobile unit, and wherein the first braking member is removably attached to the second braking member to create the confinement zone and house the movement component of the mobile unit.

The braking device wherein the first braking member includes at least one coupling bore on a first braking member attachment face, the first braking member attachment face located at a first braking member end section, and wherein the second braking member includes at least one coupling bore on a second braking member attachment face, the second braking member attachment face located at a second braking member end section.

The braking device further having a plurality of magnets, and wherein the plurality of magnets is positioned at least partially within each of the at least one coupling bore of the first braking member attachment face and the at least one coupling bore of the second braking member attachment face.

The braking device further having a first alignment extension, the first alignment extension projecting outward from the first braking member attachment face, and a second alignment extension, the second alignment extension projecting outward from the second braking member attachment face.

The braking device further having a first alignment bore, the first alignment bore being recessed into a second attachment face of the first braking member, and a second alignment bore, the second alignment bore being recessed into a second attachment face of the second braking member.

The braking device wherein the first alignment extension releasably engages with the second alignment bore, and the second alignment extension releasably engages with the first alignment bore to create the confinement zone of the braking device.

The braking device wherein each of the first alignment extension, the first alignment bore, the second alignment extension, and the second alignment bore are centrally positioned on their respective attachment faces of each the first braking member and the second braking member.

The braking device wherein the frictional material is further coupled to at least portions of each the first braking member and the second braking member, the frictional material being coupled to a surface contacting portion of each the first braking member and the second braking member.

The braking device wherein the frictional material has a higher frictional coefficient when contacting a ground surface than a surface contacting portion of the first braking member or the second braking member onto which the frictional material is coupled.

A braking device having a first braking member; a second braking member, the second braking member being removably attachable to the first braking member; a biasing mechanism, the biasing mechanism positioned and movable through either the first braking member or the second braking member; a confinement zone to house a movement component of a mobile unit, the confinement zone formed via removable attachment of the first braking member with the second braking member; and wherein the biasing mechanism is movable between a first position and a second position, the first position placing the biasing mechanism further away from the confinement zone and the second position placing the biasing mechanism further within the confinement zone for selective contact with the movement component of the mobile unit.

The braking device wherein the biasing mechanism has a first end and a second end, the first end of the biasing mechanism located outside of the confinement zone and the second end of the biasing mechanisms located within the confinement zone.

The braking device wherein the second end of the biasing mechanism engages a first movement component side of the movable component when the biasing mechanism is placed in the second position.

The braking device wherein a second movement component side of the movable component engages a side wall of either the first braking member or the second braking member to secure the movable component between the side wall and the second end of the biasing mechanism in the second position.

The braking device wherein the second end of the biasing mechanism has an end plate, the end plate in operative connection with the second end and capable of engaging a first movement component side of the movable component when the biasing mechanism is placed in the second position.

The braking device wherein the biasing mechanism has a threaded configuration and either the first braking member or the second braking member has a biasing bore with a corresponding threaded configuration to receive the biasing mechanism, the biasing mechanism positioned and movable through the biasing bore present on either the first braking member or the second braking member via a threaded connection achieved by the threaded configuration of the biasing mechanism operatively secured within the biasing bore having the corresponding threaded configuration.

The braking device wherein the biasing mechanism has a first end and a second end, the first end of the biasing mechanism located outside of the confinement zone and the second end of the biasing mechanisms located within the confinement zone, and a knob present on the biasing mechanism in operative connection with the first end, the knob having a larger surface area than the first end of the biasing mechanism, and the knob capable of rotational movement to adjust the location of the biasing mechanism via the threaded connection between the first position and the second position.

The braking device further having a hook located on either the first braking member or the second braking member, the hook useable to assist in placing the braking device into a storage position, and a carrying band coupled to the hook.

A method to secure a movable component of a mobile unit with a braking device, the method including placing a first braking member of the braking device around the movable component, wherein the movable component is located within a confinement zone of the braking device; placing a second braking member around the movable component at a location opposite the first braking member; attaching the first braking member to the second braking member to create the confinement zone surrounding the movable component; adjusting a biasing mechanism operatively coupled through either the first braking member or the second braking member, the biasing mechanism having a portion present within the confinement zone of the braking device; and wherein adjustment of the biasing mechanism moves a positional location of the biasing mechanism further into the confinement zone towards the moveable component until engagement with a first movement component side of the movable component to secure the moveable component within the confinement zone of the braking device.

The method wherein the attaching step further includes an alignment extension located on either a first braking member attachment face or a second braking member attachment face, an alignment bore located on the other of the first braking member attachment face or the second braking member attachment face, and wherein mating the alignment extension on either the first braking member attachment face or the second braking member attachment face with the alignment bore on the other of the first braking member attachment face or the second braking member attachment face further secures attachment of the first braking member to the second braking member.

The method wherein the adjusting step further includes a first end of the biasing mechanism located outside the confinement zone, a second end of the biasing mechanism located within the confinement zone, a threaded connection to operatively couple the biasing mechanism with a biasing bore through either the first braking member or the second braking member, and wherein rotational movement of the first end of the biasing mechanism facilitates adjustment of the positional location of the biasing mechanism, via the threaded connection, both further into the confinement zone to help secure the movable component via the second end of the biasing mechanism, or further away from the confinement zone to help release any previously secured movable component within the confinement zone.

BRIEF DESCRIPTION OF THE DRAWINGS

The accompanying drawings, which are incorporated in and form a part of the specification, illustrate the disclosed embodiments and, together with the description, serve to explain certain inventive principles. In the drawings.

DETAILED DESCRIPTION OF EXAMPLE EMBODIMENTS

The foregoing and other features and advantages of the invention will become more apparent from the following detailed description of exemplary embodiments, read in conjunction with the accompanying drawings. The detailed description and drawings are merely illustrative of the present disclosure rather than limiting, the scope of the invention being defined by the appended claims and equivalents thereof.

Figure 1:
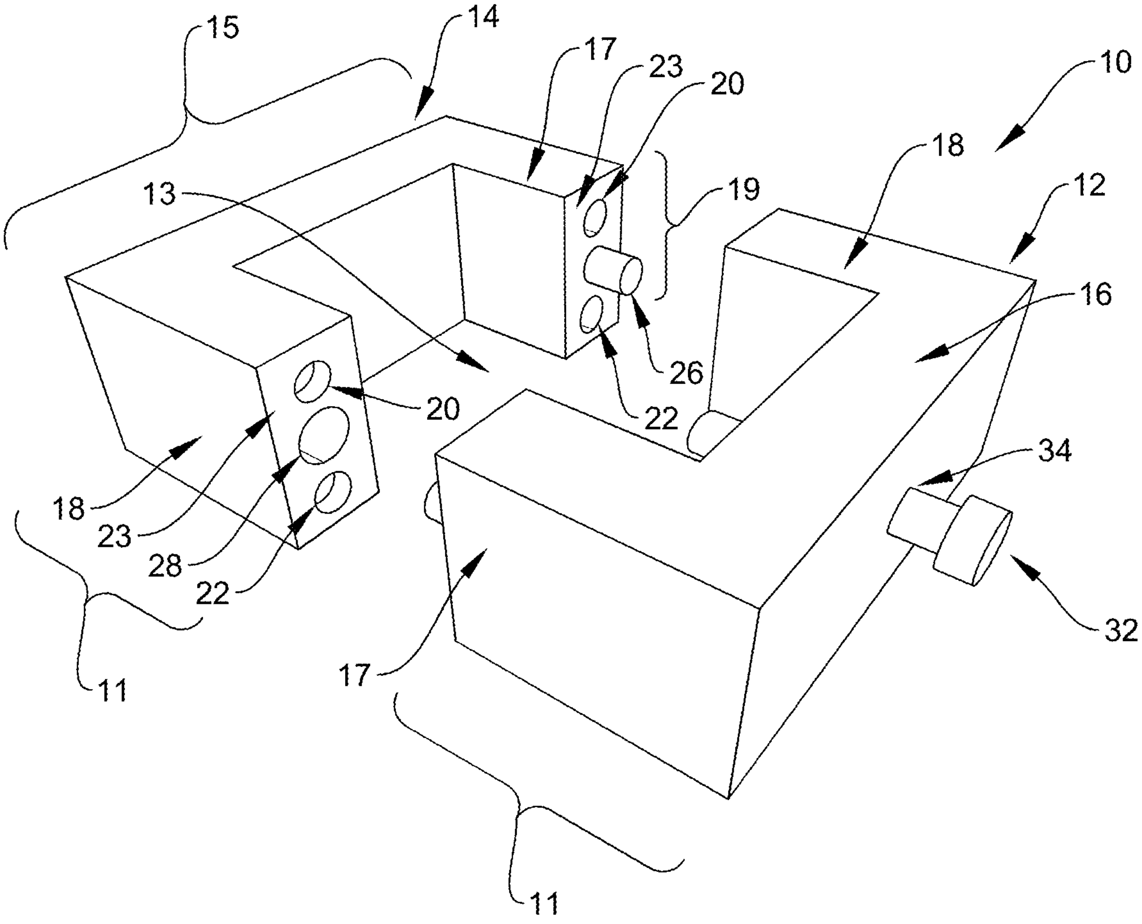
FIG. 1 shows a perspective view of an example unassembled braking device in accordance with an embodiment of the disclosure.
Figure 2:
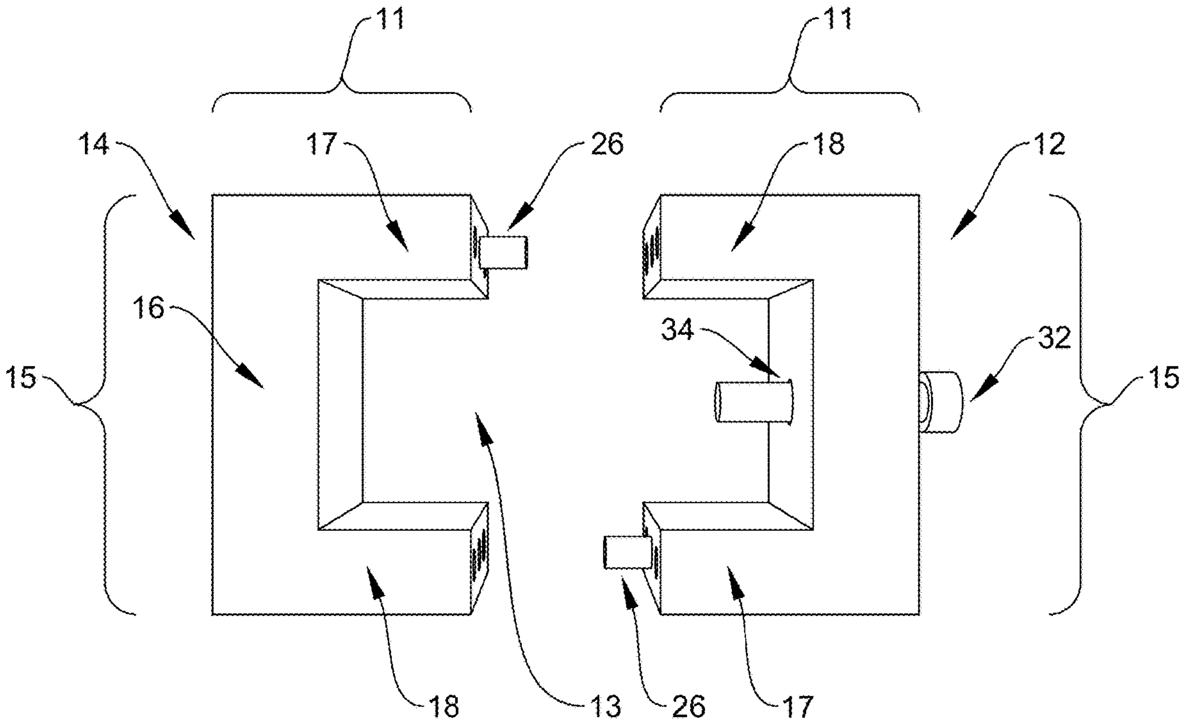
FIG. 2 shows a top view of an example unassembled braking device in accordance with an embodiment of the disclosure.

With reference to the embodiment depicted in FIGS. 1 and 2, a perspective and top view of the example braking device 10 is viewed. The example braking device 10 may include a plurality of braking members 11. The plurality of braking members 11 may be removably attachable with one another to create the general housing of the braking device 10. While the views illustrated in FIG. 1 and FIG. 2 show two braking members of the plurality of braking members 11, it should be understood that different numbers of braking members may be employed in combination with one another to create the braking device 10. Further, use of a plurality of braking members 11 allows for the universal functionality of the braking device 10. As the plurality of braking members 11 can be removably attached to one another to create the braking device 10, the size and shape of the overall braking device 10 can be adjusted based on the desires of the end user so that it may be used with, or accommodated to fit, multiple types of mobile units with movement components such as and not limited to wheels and casters.

The braking device 10 may have a plurality of positions, including a first position and a second position. The first position may be a securing position where the plurality of braking members 11 are in removable attachment with one another. In the securing position, the plurality of braking members 11 creating the braking device 10 may circumnavigate or surround the movement component, wheel, or caster attached to a mobile unit. In some envisioned embodiments, at least a portion of the braking device 10 may be located under a portion of the mobile unit in the securing position. Also, the braking device 10 in the securing position may rise to a height above the ground surface where the height of the braking device 10 prohibits or limits the ability of the movement component, wheel, or caster rolling over the plurality of braking members 11 creating the braking device 10 in the securing position. The second position of the braking device 10 may be an unassembled position, wherein the plurality of braking members 11 are disconnected from one another. In the unassembled position, the plurality of braking members 11 may not inhibit the movement of a mobile unit by way of its movement components, wheels, or casters. In the unassembled position, the mobile unit is free to move and not confined by the braking device 10. The user may also utilize different possible storage options for the plurality of braking members 11 and the braking device 10 when it is located in the unassembled second position.

As viewed in FIGS. 1 and 2, the braking device 10 is shown in the second position or unassembled position. In the first position, or securing position, as viewed in FIGS. 5 and 6, the braking device 10 may create a confinement zone 13. In the securing position, the confinement zone 13 provides a central location where the movement component 41, wheel, casters, or the like of a mobile unit may be housed and surrounded by the assembled braking device 10. The confinement zone 13 should be sized larger than the movement component 41, wheel, casters, or the like such that the movement component 41, wheel, casters, or the like of a mobile unit may be fully encompassed and encircled by the braking device 10.

FIGS. 1 and 2 illustrate a first braking member 12 and a second braking member 14 of the plurality of braking members 11 in an example embodiment of the disclosure. The plurality of braking members 11 can be made of any material sufficient to withstand the braking and engagement forces described including metals, metallic alloys, plastics, polymers, wood, or any other suitable material or combinations thereof. As seen by FIGS. 1 and 2, the first and second braking members 12 and 14 are substantially the same size and shape. Each braking member of the plurality of braking members 11 used to form the braking device 10 may project a generally U-shaped configuration. For example, and viewed in FIGS. 1 and 2, the generally U-shaped configuration may be created by a plurality of member sections 15. With the generally U-shaped configuration, the plurality of member sections 15 may have an approximate cuboid configuration, but it should be understood that different designs and shapes are possible and envisioned. The plurality of member sections 15 with the cuboid configuration may be formed of a single material piece by way of injection molding, material printing, or extrusion of the desired material used to create the overall braking member. Alternatively, the plurality of member sections 15 may be distinct and separate components that can be affixed together to create the generally U-shaped configuration.

While FIGS. 1 and 2 illustrate the generally U-shaped configuration possible with each braking member created by the plurality of braking members 11, it is envisioned that the shape and design of the plurality of braking members 11 need not be restrained to such a U-shaped configuration. It is alternatively envisioned that the plurality of braking members 11, viewed individually or combined in removable attachment to form the braking device 10, may be V-shaped, C-shaped, horseshoe, elliptical, oval, pentagonal, hexagonal, or octagonal, or any other shape sufficient to make an enclosure connection with the additional braking members to secure the movement component, wheel, caster, or the like of a mobile unit. In other possible embodiments, the plurality of braking members 11 can be sized and shaped differently such that the first braking member may employ a configuration distinct from the second or other braking members. For example, in this type of differently shaped braking member embodiments, the first braking member may be a generally U-shaped design while the second braking member may have a linear straight cuboid configuration.

The plurality of member sections 15 may include a central section 16 and a first end section 17 and a second end section 18. The first end section and the second end section 17 and 18 may be viewed as arms extending from the termination ends of the central section 16 in the example U-shaped configuration viewed in FIGS. 1 and 2. The first end section and the second end section 17 and 18 may be positioned normal, or in an approximate ninety-degree alignment from, the central section 16 along a horizontal plane. Of course, other positional alignments and relationships between the first end section 17, the second end section 18, and the central section 16 are possible and envisioned by the inventors. The central section 16, the first end section 17, and the second end section 18 may lay flat on the horizontal plane to contact a lower surface.

Figure 3:
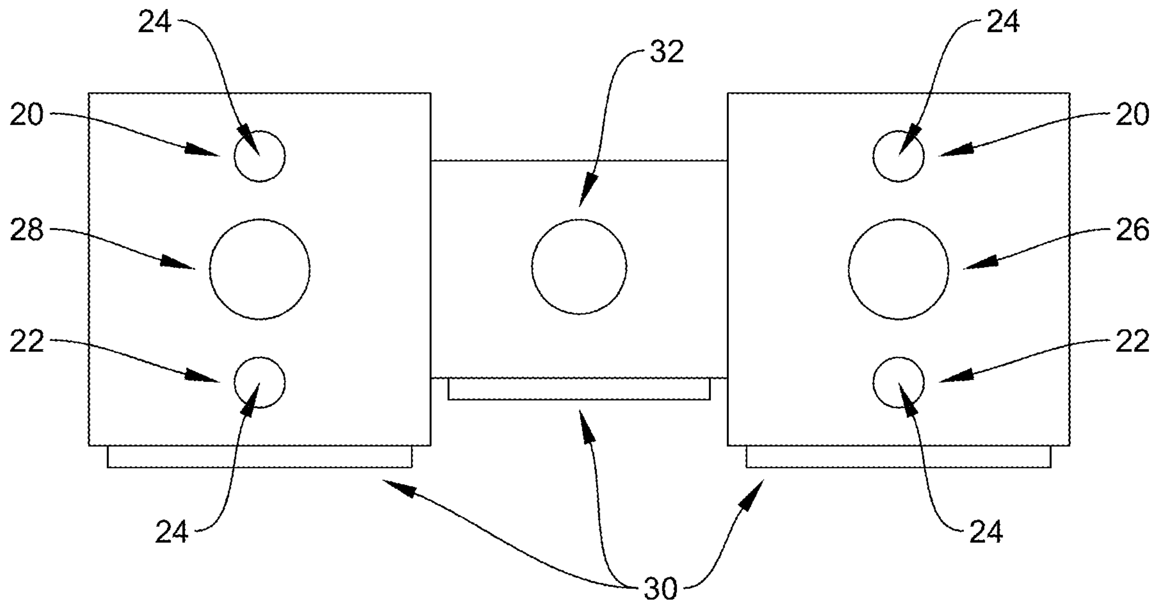
FIG. 3 shows a front view of a first braking member of the braking device in accordance with an embodiment of the disclosure.
Figure 4:
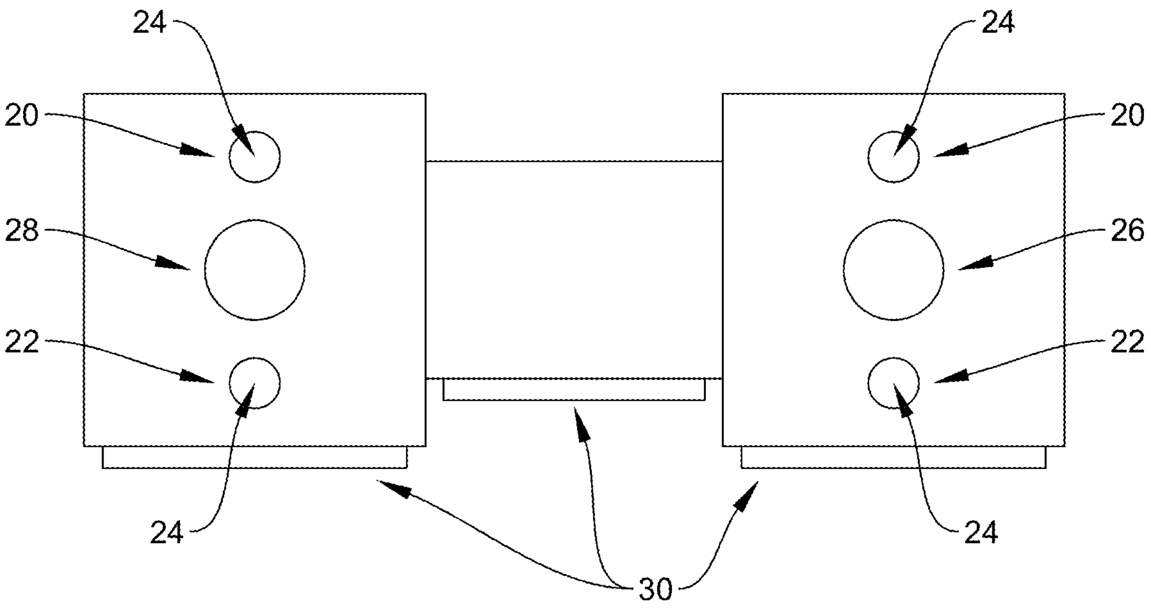
FIG. 4 shows a front view of a second braking member of the braking device in accordance with an embodiment of the disclosure.

The plurality of braking members 11 may include a plurality of coupling bores 19. As depicted in FIG. 1, the first and second braking members 12 and 14 each include an upper coupling bore 20 and a lower coupling bore 22 on the attachment face 23 of each of the first end section and the second end section 17 and 18. While the views illustrated in FIGS. 1-4 show an upper coupling bore 20 and a lower coupling bore 22, each braking member may include less or more coupling bores. It should also be understood that the plurality of coupling bores 19 can be positioned in different spots along the attachment face 23 of the respective end section. As depicted in FIGS. 3 and 4, the upper and lower coupling bores 20 and 22 are configured and created to hold a plurality of magnets 24. Each of the plurality of coupling bores 19 is a void space into the interior of the attachment faces 23 and of adequate size to accommodate a magnet of the plurality of magnets 24. Each of the plurality of magnets 24 present on a first braking member 12, may be configured and placed in a desired polarity orientation to engage with the plurality of magnets 24 placed within each of the plurality of corresponding bores 19 on the opposite attachment face 23 of the second braking member 14. In the exemplary embodiment, the magnets 24 may be Neodymium magnets, but the magnets 24 can be any type of magnetized material composition. The opposite braking member may alternatively include a surface with an amount of iron, cobalt, or nickel to provide the surface the ability to interact with magnetic forces instead of a magnet configured and positioned with an opposite polarity orientation. It should also be understood that the coupling bores 20 and 22 and magnets 24 could instead be replaced by a different coupling means such as detachable hooks, snaps, buttons, a hook and loop system, a hinge, or any combination thereof.

Referring back to FIGS. 1 and 2, the first and second braking members 12 and 14 may each further include an alignment extension 26 projecting outward from one of the first end section or the second end section 17 and 18 and an alignment bore 28 recessed into the interior of the opposing first end section or the second end section 17 and 18 creating a void area for the alignment bore 28. The alignment bore 28 may be sized to receive the alignment extension 26 from the opposite braking member 12 and 14. As depicted in FIGS. 1 and 2, the alignment extension 26 may be a cylindrical extension projecting outward from the first end section 17 of each of the first and second braking members 12 and 14 and the alignment bore 28 may be shaped, sized, and recessed into the second end section 18 of each of the first and second braking members 12 and 14 to engage the alignment extension 26. It should be understood that the alignment extension 26 and alignment bore 28 can be any shape to engage each other, such as a triangular prism, cuboid, or other common or irregular shape. In some embodiments, there can be additional alignment extensions 26 and alignment bores 28. In other embodiments, the first end section 17 can have both alignment extensions 26 and alignment bores 28 and the second end section 18 can also have corresponding alignment extensions 26 and alignment bores 28. Further, the alignment extensions 26 and alignment bores 28 can be sized larger or smaller. In FIGS. 1 and 2, the alignment extension 26 and alignment bore 28 may be positioned approximately at the center of the attachment face 23 of the first end section and the second end section 17 and 18. Of course, different locations along the attachment face 23 of the first end section and the second end section 17 and 18 are possible and envisioned for the alignment extensions 26 and alignment bores 28. In the exemplary embodiment, the alignment extension 26 and alignment bore 28 are made of the same material as the first and second braking members 12 and 14. Further, in the exemplary embodiment, the alignment extensions 26 are an extension from, and therefore, one piece with the first and second braking members 12 and 14. The alignment extension 26 can alternatively be a separate piece coupled to the appropriate attachment face 23 of either the first and second braking members 12 and 14, even if made of the same material, or the alignment extension 26 and alignment bore 28 can be made of different materials than the first and second braking members 12 and 14 and coupled to the first and second braking members 12 and 14.

As depicted in FIGS. 1 and 2, the braking device 10 further includes a biasing mechanism 32. In the exemplary embodiment, the biasing mechanism 32 may be a threaded bolt. The biasing mechanism 32 may be inserted into the confinement zone 13 until it engages the movement component, wheel, casters, or the like of a mobile unit, pushing it against the opposite wall of either the first or second braking member 12 or 14, locking the movement component, wheel, casters, or the like of a mobile unit in place. In some example embodiments, the biasing mechanism 32 can further include a locking nut (not viewed). It should also be understood that the biasing mechanism 32 may be movable into different positions via a spring mechanism coupled to the first braking member 12 such that the making contact with the caster will compress the biasing mechanism 32 and in turn the biasing mechanism 32 will translate the spring force back onto the movement component, wheel, caster, or the like.

As depicted in FIGS. 1 and 2, the first braking member 12 further includes a biasing bore 34. In the exemplary embodiment, the biasing bore 34 may be threaded. The biasing mechanism 32 may be screwed into the threaded biasing bore 34 to engage the movement component, wheel, caster, or the like, locking it into a specific position. In alternative embodiments the biasing bore 34 may not be threaded. In further alternative embodiments, the biasing bore 34 can be a clamp. In such an embodiment, when the biasing mechanism 32 is inserted into the biasing bore 34 it extends through the first braking member 12 and makes contact with the movement component, wheel, caster, or the like, the biasing bore 34 may be clamped locking the biasing mechanism 32 in place. It is also envisioned by the inventors that alternative embodiments do not require the first braking member 12 to be the specific location of the biasing bore 34, and that the biasing bore 34 may be present as discussed and described above on either the second braking member 14, or a different braking member if there are more than two braking members.

Referring to FIGS. 3 and 4, the braking device 10 further includes a frictional material 30 coupled to the bottom of the first and second braking members 12 and 14. In the exemplary embodiment, the frictional material 30 may be made out of foam. However, the frictional material 30 can alternatively be made out of rubber or other, similar materials, or any other material having a greater frictional coefficient than the material used to create the first and second braking members 12 and 14. As depicted in FIGS. 3 and 4, the frictional material 30 may be coupled to the central section 16, the first end section 17, and the second end section 18 of both the first and second braking members 12 and 14. Of course, the frictional material 30 can be coupled to the bottom of additional braking members if there are more than two braking members. Alternatively, the frictional material 30 can be coupled to less than every braking member used. It should also be understood that the frictional material 30 can be coupled to less than the entirety of the braking member that it is coupled to, such as only being coupled to the central section 16, only being coupled to the first end section and the second end section 17 and 18, only coupled to one of the first end section or the second end section 17 and 18, or only coupled to the central section 16 and one of the first end section or the second end section 17 and 18. The frictional material 30 is designed to provide a frictional force sufficient to prevent the movement component, wheel, caster, or the like from displacing the braking device 10 positioned around the movement component, wheel, caster, or the like of the mobile unit if a force is applied to the mobile unit causing the movement component, wheel, caster, or the like to contact the first or second braking member 12 or 14 of the braking device 10.

Figure 5:
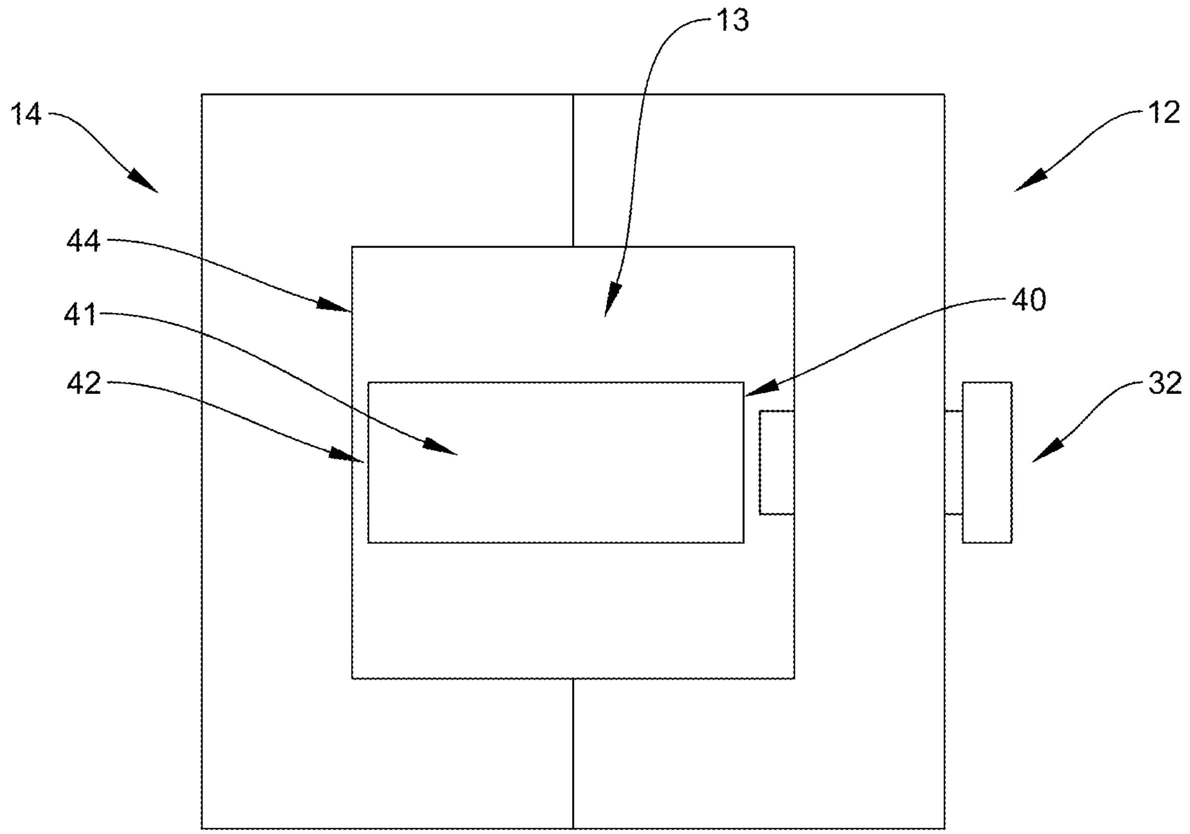
FIG. 5 shows a top view of an example braking device in an assembled and unengaged position in accordance with an embodiment of the disclosure.
Figure 6:
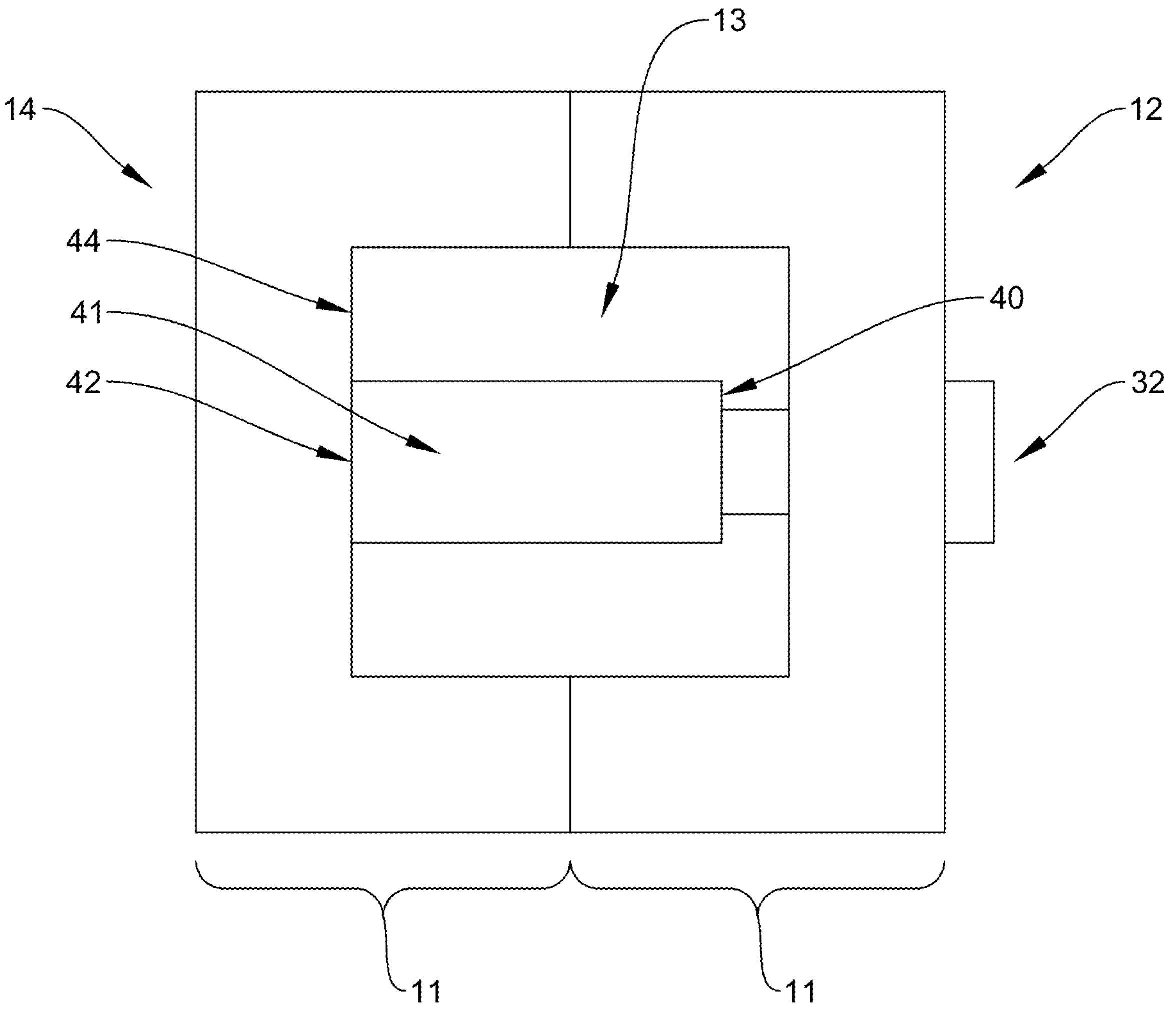
FIG. 6 shows a top view of an example braking device in an assembled and engaged position in accordance with an embodiment of the disclosure.

With reference to FIGS. 5 and 6, the braking device 10 is depicted in an assembled position with a movement component 41, wheel, caster, or the like inside the enclosure. FIG. 5 depicts the biasing mechanism 32 in an unlocked position and unengaged with the movement component 41, while FIG. 6 depicts the biasing mechanism 32 in a locked position and engaged with the caster. The biasing mechanism 32 may be partially located both within the confinement zone 13 and outside of the confinement zone 13 in both a locking position of a locking operation or an unlocked position for an unlocked operation depending on the current desired operational use of the braking device 10 by the end user. As previously described, the biasing mechanism 32 may be inserted into the confinement zone 13 until it engages the movement component 41, wheel, casters, or the like of a mobile unit, pushing it against the opposite wall of either the first or second braking member 12 or 14, locking the movement component 41, wheel, casters, or the like of a mobile unit in place. In the locked position for the locked operation, the biasing mechanism 32 may engage the movement component 41, wheel, casters, or the like of a mobile unit, within the confinement zone 13 contacting the movement component 41, wheel, caster, or the like on a first movement component side 40. The engagement of the biasing mechanism 32 with the movement component 41, wheel, caster, or the like on a first movement component side 40 pushes the movement component 41, wheel, caster, or the like, in such a manner that a second movement component side 42 engages in frictional contact with a side wall portion 44 of either the first or second braking member 12 or 14. Thus, in this locked position for the locked operation of the braking device 10, the biasing mechanism 32 may lock or restrict positional or rotational movement of the movement component 41, wheel, caster, or the like of a mobile unit in place within the confinement zone 13.

As FIG. 6 depicts, the plurality of braking members 11 must be attached with greater force than the force the biasing mechanism 32 exerts against the movement component 41 locking the movement component 41 against the side wall portion 44 of either the first or second braking member 12 or 14 to prevent the braking device 10 from disassembling. It should be understood that the caster can be rotated 90 degrees in both the unengaged and engaged position. Further, while the movement component 41 is centered in FIGS. 5 and 6, the movement component 41 can be off center as long as the biasing mechanism 32 is able to engage with the movement component 41.

Figure 7:
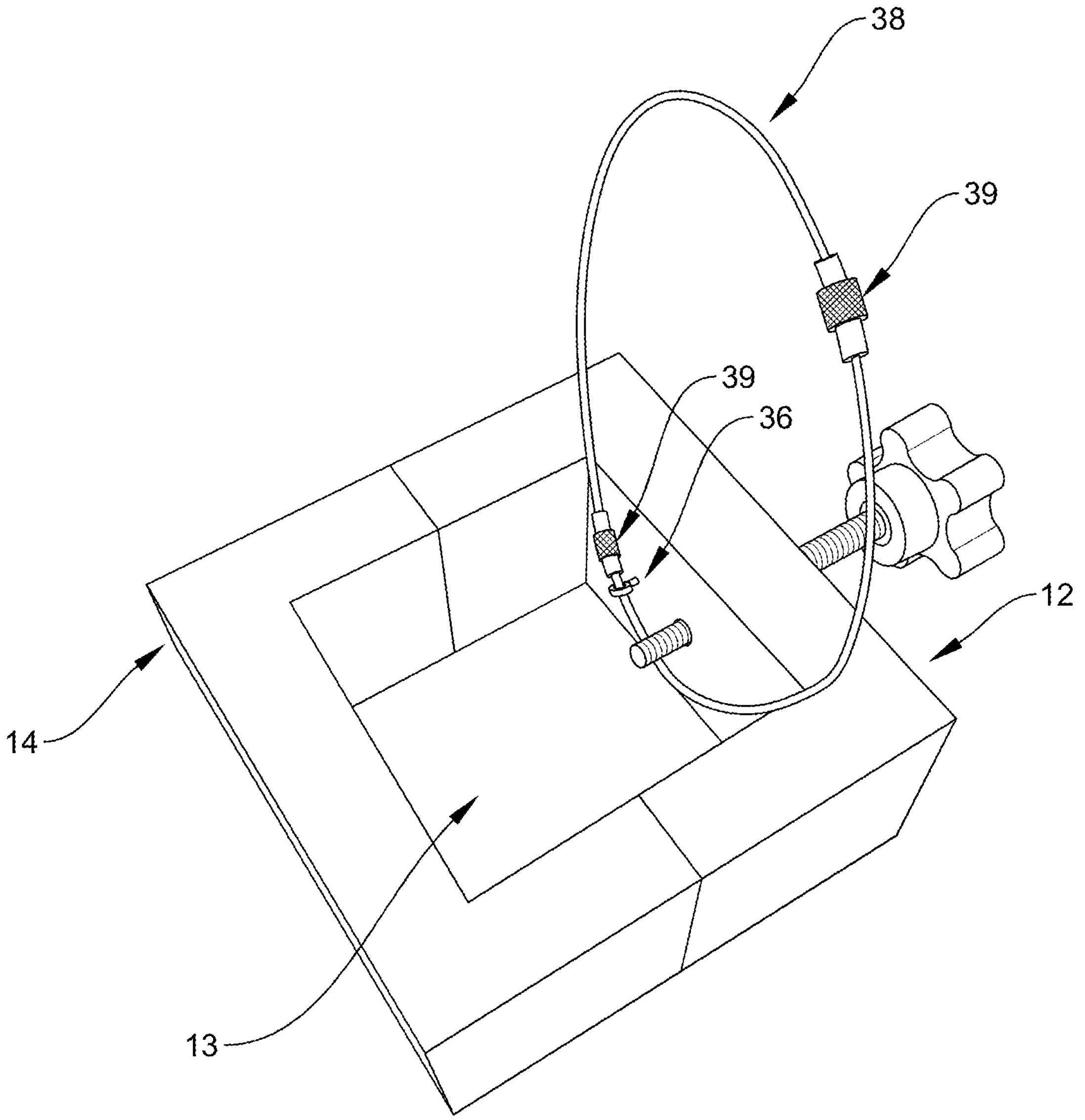
FIG. 7 shows a perspective view of an example assembled braking device with an optional storage feature in accordance with an embodiment of the disclosure.

Referring to FIG. 7, the braking device 10 further includes a hook 36 and a carrying band 38. The hook 36 may be coupled to one of the braking members 12 and 14. In the exemplary embodiment, the hook 36 may be located on the interior of one of the braking members 12 and 14. As depicted in FIG. 7, the hook 36 is located on the interior of the first braking member 12 on the central section 16. The carrying band 38 may be coupled to the hook 36. When the braking device 10 is in use, the carrying band 38 may hang from the hook 36 and be positioned outside of the confinement zone 13 as to not interfere with the movement component, wheel, caster, or the like, engaging with the biasing mechanism 32 when operationally placing the braking device 10 between a locking and unlocking position. When the braking device 10 is no longer needed, the user can use the carrying band 38 to hang the braking device 10 from an item, such as the mobile unit. In an example embodiment, the carrying band 38 is two pieces that can connect and disconnect from each other by a connection piece 39, which allows the carrying band 38 to detach from the hook 36 and any item the user hangs the braking device 10 from. In alternative embodiments, the carrying band 38 is one piece with only one connection point that connects two ends, or the carrying band 38 is one piece that does not disconnect from the hook 36. The hook 36 can alternatively be positioned on the top of, or the exterior of one of the braking members 12 and 14.

Figure 8:
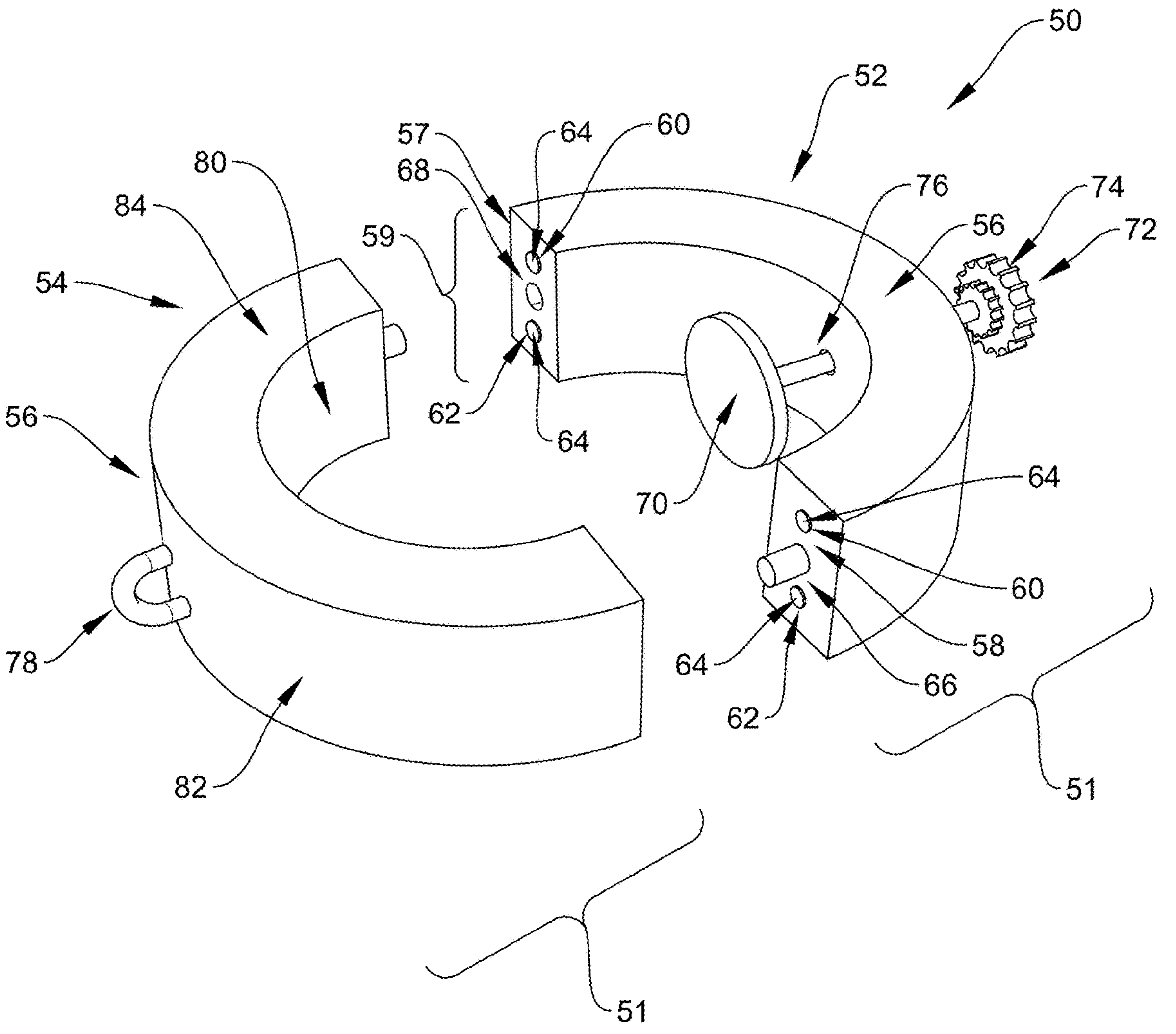
FIG. 8 shows a perspective view of an example unassembled braking device in accordance with an alternate embodiment of the disclosure.

FIG. 8 discloses an alternative embodiment and configuration of the braking device 50. The elements and components described above with respect to the earlier disclosed embodiment may also be present and operational in a similar fashion as detailed earlier in this disclosure. Further, additional features, configurations, designs, and functionality of this alternative embodiment are viewed and discussed in further detail below. In FIG. 8, the braking device 50 includes a first braking member 52 and a second braking member 54. It should be understood that just as the embodiment depicted in FIGS. 1-7, the braking device 50 may include a plurality of braking members 51 that is a more or less than the two depicted in FIG. 8. In the example embodiment, the plurality of braking members 51 can be made of any material sufficient to withstand the braking and engagement forces described including metals, metallic alloys, plastics, polymers, wood, or any other suitable material or combinations thereof.

The braking device 50 may have a plurality of positions, including a first position and a second position. The first position may be a securing position where the plurality of braking members 51 are in removable attachment with one another. In the securing position, the plurality of braking members 51 creating the braking device 50 may circumnavigate or surround the movement component, wheel, or caster, or the like, attached to a mobile unit. In some envisioned embodiments, at least a portion of the braking device 50 may be located under a portion of the mobile unit in the securing position. Also, the braking device 50 in the securing position may also rise to a height above the ground surface where the height of the braking device 50 prohibits or limits the ability of the movement component, wheel, caster, or the like, from rolling over the plurality of braking members 51 creating the braking device 50 in the securing position and leaving a confinement zone (not viewed but discussed above in detail with reference to FIGS. 1-6 and should be understood to occur here with this embodiment). The second position of the braking device 50 may be an unassembled position, wherein the plurality of braking members 51 are disconnected from one another. In the unassembled position, the plurality of braking members 51 may not inhibit the movement of a mobile unit by way of its movement components, wheels, casters, or the like. In the unassembled position, the mobile unit is free to move and not confined by the braking device 50. The user may also utilize different possible storage options for the plurality of braking members 51 and the braking device 50 when it is located in the unassembled second position as discussed both above in reference to FIG. 7 and below.

As viewed in FIG. 8, the braking device 50 is shown in the second position or unassembled position. The braking device 50 may create the confinement zone (not viewed) in the first position or the assembled securing position. In the securing position, the confinement zone provides a central location where the movement component, wheel, casters, or the like of a mobile unit may be housed and surrounded by the assembled braking device 50. The confinement zone should be sized larger than the movement component, wheel, casters, or the like of a mobile unit such that the movement component, wheel, casters, or the like of a mobile unit may be fully encompassed and encircled by the braking device 50.

As seen by FIG. 8, the first and second braking members 52 and 54 are substantially the same size and shape. It should be understood that, just as in the previous embodiment, the plurality of braking members can be sized and shaped differently from each other. For example, in these types of differently shaped braking member embodiments, the first braking member may be a generally semicircular, or viewed as a C-shaped, design while the second braking member may have a linear straight cuboid configuration. In FIG. 8, the first and second braking members 52 and 54 depicted are each semicircular, or C-shaped. The first and second braking members 52 and 54 may include a central section 56 that smoothly transitions into a first attachment face and a second attachment face 57 and 58 at each end. In the exemplary embodiment, the first and second braking members 52 and 54 are each one piece. It should also be understood that, just as in the previous embodiment, the plurality of braking members 51, viewed in removable attachment to form the braking device 50, may be U-shaped, V-shaped, horseshoe, elliptical, oval, pentagonal, hexagonal, or octagonal, or any other shape sufficient to make an enclosure connection with the additional braking members to secure the movement component, wheel, caster, or the like of a mobile unit. In some of these above configurations of the plurality of braking members, each braking member may have a plurality of braking sections as described above with earlier example embodiments. Each braking member 52 and 54 may lay flat on a horizontal plane to contact a ground surface. Of course, other positional alignments and relationships are possible and envisioned by the inventors.

The plurality of braking members 51 may include a plurality of coupling bores 59. As depicted in FIG. 8, the first and second braking members 52 and 54 each include an upper coupling bore 60 and a lower coupling bore 62 on the attachment face 57 and 58 of each of the end of the braking members 52 and 54. While the view illustrated in FIG. 8 show an upper coupling bore 60 and a lower coupling bore 62, each braking member may include less or more coupling bores. It should also be understood that the plurality of coupling bores 59 can be positioned in different spots along each of the first and second attachment face 57 and 58 of each braking member 52 and 54. As depicted in FIG. 8, the upper and lower coupling bores 60 and 62 are configured and created to hold a plurality of magnets 64. Each of the plurality of coupling bores 59 is a void space into the interior of the attachment faces 57 and 58 and of adequate size to accommodate a magnet of the plurality of magnets 64. Each of the plurality of magnets 64 present on a first braking member 52, may be configured and placed in a desired polarity orientation to engage with the plurality of magnets 64 placed within each of the plurality of corresponding bores 59 on the opposite attachment face 57 and 58 of the second braking member 54. In the exemplary embodiment, the magnets 64 may be Neodymium magnets, but the magnets 64 can be any type of magnetized material composition. The opposite braking member may alternatively include a surface with an amount of iron, cobalt, or nickel to provide the surface the ability to interact with magnetic forces instead of a magnet configured and positioned with an opposite polarity orientation. It should also be understood that the coupling bores 60 and 62 and plurality of magnets 64 could instead be replaced by a different coupling means such as detachable hooks, snaps, buttons, a hook and loop system, a hinge, or any combination thereof.

As depicted in FIG. 8, the first and second braking members 52 and 54 each further include an alignment extension 66 projecting outward from one of either attachment face 57 and 58 of the first and second braking member 52 and 54. The opposing attachment face 57 and 58 of the first or second braking member 52 and 54 may have an alignment bore 68 recessed into the interior of the attachment face 57 and 58 creating a void area for the alignment bore 68. Each of the first braking member 52 and the second braking member 54 may have opposing configurations and placement of the alignment extension 66 and alignment bore 68 with respect to one another. Having these opposing configurations of like components allows for the first braking member 52 to receive the alignment extension 66 of the second braking member 54 within the first braking member alignment bore 68 by way of each corresponding attachment faces 57 and 58 meeting between the first and second braking members 52 and 54. Subsequently, the second braking member 54 may then receive the alignment extension 66 of the first braking member 52 within the alignment bore 68 of the second braking member 54 in a similar fashion by way of each corresponding attachment faces 57 and 58 meeting between the first and second braking members 52 and 54. As depicted in FIG. 8, the alignment extension 66 may be a cylindrical extension projecting outward from one of the attachment faces 57 and 58 of either end portion of each the first and second braking members 52 and 54. The alignment extension 66 is shaped, sized, and recessed into the opposite attachment face 57 and 58 of each of the first and second braking members 52 and 54 to engage the alignment extension 66. It should be understood that the alignment extension 66 and alignment bore 68 can be any shape to engage each other, such as a triangular prism, cuboid, or other common or irregular shape. In some embodiments, there can be additional alignment extensions 66 and alignment bores 68. In other embodiments, the attachment faces 57 and 58 of either the first or second braking members 52 and 54 can have both alignment extensions 66 and alignment bores 68 and the opposite attachment face 57 and 58 on the other end of either the first or second braking members 52 and 54 can also have corresponding alignment extensions 66 and alignment bores 68. Further, the alignment extensions 66 and alignment bores 68 can be sized larger or smaller. In FIG. 8, the alignment extension 66 and alignment bore 68 are positioned approximately at the center of each attachment face 57 and 58 of either the first or second braking members 52 and 54. Of course, different locations along the first attachment face and second attachment face 57 and 58 are possible and envisioned for the alignment extensions 66 and alignment bores 68. In the exemplary embodiment, the alignment extension 66 and alignment bore 68 are made of the same material as the first and second braking members 52 and 54. Further, in the exemplary embodiment, the alignment extensions 66 are an extension from, and therefore, may be form as a single material piece as the first or second braking members 52 and 54. The alignment extension 66 can alternatively be a separate piece coupled to the appropriate attachment face 57 and 58 of either the first or second braking members 52 and 54, even if made of the same material, or the alignment extension 66 and alignment bore 68 may be made of different respective materials than the materials used in the creation and configuration of the first or second braking members 52 and 54 and coupled to the appropriate attachment face 57 and 58 of either the first or second braking members 52 and 54.

As depicted in FIG. 8, the braking device 50 further includes a biasing mechanism 72. In this embodiment, the biasing mechanism 72 may be a threaded bolt. The biasing mechanism 72 may be inserted into the confinement zone. The biasing mechanism 72 may be partially located both within the confinement zone and outside of the confinement zone in both a locking position of a locking operation or an unlocked position for an unlocked operation depending on the current desired operational use of the braking device 50 by the end user. In the unlocked position for the unlocked operation of the braking device 50 in the assembled position, the biasing mechanism 72 may be partially located within the confinement zone but not engaged with the movement component, wheel, caster, or the like of a mobile unit also positionally present within the confinement zone.

In the locked position for the locked operation of the braking device 50 in the assembled position, the biasing mechanism 72 may also be partially located within the confinement zone and likely further placed into the confinement zone and engaged with the movement component, wheel, caster, or the like of a mobile unit also positionally present within the confinement zone. In the locked position for the locked operation, the biasing mechanism 72 may engage the movement component, wheel, casters, or the like of a mobile unit, within the confinement zone contacting the movement component, wheel, caster, or the like on a first movement component side (not viewed but discussed above in detail with reference to FIGS. 5-6 and should be understood to occur here with this embodiment). The engagement of the biasing mechanism 72 with the movement component, wheel, caster, or the like on a first movement component side pushes the movement component, wheel, caster, or the like, in such a manner that a second movement component side engages in frictional contact with an interior side wall portion 80 of either the first or second braking member 52 or 54. Thus, in this locked position for the locked operation of the braking device 50, the biasing mechanism 72 may lock or restrict positional or rotational movement of the movement component, wheel, caster, or the like of a mobile unit in place within the confinement zone. As described in more detail above in reference to FIG. 6, the plurality of braking members 51 must be attached with greater force than the force the biasing mechanism 72 exerts against the movement component locking the movement component against the interior side wall portion 80 of either the first or second braking member 52 or 54 to prevent the braking device 50 from disassembling. In some example embodiments, the biasing mechanism 72 can further include a locking nut (not viewed). It should also be understood that the biasing mechanism 72 may be movable into different positions via a spring mechanism coupled to the first braking member 52 such that the making contact with the movement component, wheel, caster, or the like, will compress the biasing mechanism 72 and in turn the biasing mechanism 72 will translate the spring force back onto the movement component, wheel, caster, or the like of a mobile unit.

As seen in FIG. 8, a first end of the biasing mechanism 72 may have a knob 74. The knob 74 may provide an easier gripping point for the end user to adjust placement of the biasing mechanism 72 within the confinement zone. With use of the knob 74, the end user can rotate the biasing mechanism 72 which may be threaded and placed within the biasing bore 76 (which may also be threaded in some embodiments). Rotation of the knob 74 in either the clockwise or counterclockwise direction may move the location of the biasing mechanism 72 further into the confinement zone. This increase in locational movement may place the biasing mechanism 72 in a position to engage with the movement component, wheel, caster, or the like on a first movement component side to assist in creating the final and locked position for locked operation of the braking device 50. In other operational use situations, this increase in locational movement may place the biasing mechanism 72 in a position closer to the location of the first movement component side of the movement component, wheel, caster, or the like, so that minimal end user manipulation of the biasing mechanism 72 via the knob 74 is needed to create the final and locked position for locked operation of the braking device 50 when desired by the end user. The knob 74 may be a secondary component part affixed to the first end of the biasing mechanism 72. In other embodiments, the biasing mechanism 72 may be molded or machined to include a knob 74. The knob 74 may further have a plurality of indentations that depressed into the interior area of the knob 74 along the circumference of the knob 74. The knob 74 having these plurality of indentations can allow for easier gripping of the knob 74, and in turn the biasing mechanism 72, and allow for easier rotation of the biasing mechanism 72 to adjust its locational presence within the confinement zone.

As depicted in FIG. 8, the first braking member 52 may include a biasing bore 76. As viewed in the example embodiment and discussed above, the biasing bore 76 may be threaded so that a positional location of the biasing mechanism 72 within the confinement zone may be adjusted by the end user. The biasing mechanism 72 may be screwed into the threaded biasing bore 76 to engage, or be positioned closer to, the first movement component side of the movement component, wheel, caster, or the like. Depending on whether the final and locked position for locked operation of the braking device 50 is desired by the end user, use of the biasing bore 76 engages the biasing mechanism 72 with the first movement component side of the movement component, wheel, caster, or the like locking the movement component, wheel, caster, or the like into a secured position. In alternative embodiments the biasing bore 76 may not be threaded. In further alternative embodiments the biasing bore 76 could be a clamp. In such an embodiment, when the biasing mechanism 72 is inserted into the biasing bore 76 it extends through the first braking member 52 and makes contact with the movement component, wheel, caster, or the like, the biasing bore 76 may be clamped locking the biasing mechanism 72 in place. It is also envisioned by the inventors that alternative embodiments do not require the first braking member to be the specific location of the biasing bore 76, and that the biasing bore 76 may be present as discussed and described above on either the second braking member 54, or a different braking member if there are more than two braking members.

The braking device 50 may also include a frictional material (not viewed but discussed above in detail with reference to FIGS. 1-4 and should be understood to occur here with this embodiment) coupled to the bottom of the first and second braking members 52 and 54. In the exemplary embodiment, the frictional material may be made out of foam. However, the frictional material can alternatively be made out of rubber or other, similar materials, or any other material having a greater frictional coefficient than the material used to create the first and second braking members 52 and 54. As viewed in FIGS. 1-4 and can also be present in the example embodiment viewed in FIG. 8, the frictional material may be coupled to the bottom of all or part of the first or second braking members 52 and 54. Further, if additional braking members are employed in embodiments with more than two braking members, the frictional material may be present on all or part of the additional braking members in these example embodiments. It should also be understood that the frictional material can be coupled to less than every braking member used in the various envisioned embodiments of the disclosure. Further, and referenced above, the frictional material may be coupled to less than the entirety of the braking member that it is coupled to, such as only being coupled to lower portions of either the first or second braking members 52 and 54 where the second movement component side of the movement component, wheel, caster, or the like of the mobile unit is likely to engage in frictional contact with the interior side wall portion 80 of either the first or second braking member 52 or 54 when the braking device 50 is placed in the locked position or during the locking operation. As stated above in the discussion of FIGS. 1-4, the frictional material of FIG. 8 may be designed to provide a frictional force sufficient to prevent the movement component, wheel, caster, or the like from displacing the braking device 50 positioned around the movement component, wheel, caster, or the like of the mobile unit if a force is applied to the mobile unit causing the movement component, wheel, caster, or the like to contact the first or second braking member 52 or 54 of the braking device 50.

As depicted in FIG. 8, an end plate 70 may be present and attachable or affixed to the second end of the biasing mechanism 72. The end plate 70 may present a larger surface area than the second end of the biasing mechanism 72 by itself and without the end plate 70 attached or affixed to the second end. Having a larger surface area on the end plate 70 allows for the end plate 70, and in turn the biasing mechanism 72, to have a stronger and larger distribution of engagement points to secure the position of the movement component, wheel, caster, or the like of the mobile unit when the end plate 70 is engaged in frictional contact with the first movement component side of the movement component, wheel, caster, or the like in the locked position or during operation of the braking device 50 into the locking position. Thus, the end plate 70 allows the biasing mechanism 72 to have a stronger engagement with the movement component, wheel, caster, or the like. As viewed in FIG. 8, the end plate

70 may have a circular design configuration, but other larger surface areas of various designs or geometrical shapes are envisioned and possible. The larger surface area of the end plate 70 may also be positioned along a vertical axis and may be perpendicular to a horizontal axis noted and aligned with the positional placement of the biasing mechanism 72 by way of the biasing bore 76 through either the first or second braking member 52 or 54. In the exemplary embodiment, the surface area of the end plate 70 may be covered with a material or be created with a material that is textured in order to engage the caster more securely. For example, the textured surface area of the end plate 70 may include a plurality of ridges and a plurality of depressions to provide multiple points of contact engagement with the first movement component side of the movement component, wheel, caster, or the like. Further, the textured surface area of the end plate 70 may also be a malleable material so that tightening of the biasing mechanism 72 minimally deforms and spreads the textured surface area slightly to increase the surface area of the end plate 70 in contact with the first movement component side of the movement component, wheel, caster, or the like. Thus, an increase in contacting surface area of the end plate 70 with the first movement component side of the movement component, wheel, caster, or the like adds to the securing nature of engagement between components and increases the frictional forces possible and exerted by the end plate 70 onto the first movement component side. Both the end plate 70, its surface area, and any covering or material of the end plate 70 with texture may have a larger frictional coefficient than the material used to create the biasing mechanism 72 to create this securer engagement. Further, in the exemplary embodiment, the end plate 70 may be made of a different material than the biasing mechanism 72 and may be affixed and not removable from to the second end of biasing mechanism 72. Alternatively, the end plate 70 can be made of the same material as the biasing mechanism 72 regardless of whether a separate piece coupled to the biasing mechanism 72 or created as one piece with the biasing mechanism 72. Thus, in this envisioned configuration at least a portion of the biasing mechanism 72 will be located in either the locked position or the unlocked position of the assembled braking device 50 within the confinement zone. It should be understood that this end plate 70 can be used with the biasing mechanism 72 in various embodiments of the braking device, including the embodiment depicted by FIGS. 1-7.

As depicted in FIG. 8, the braking device 50 may further include a hook 78. In this illustrated embodiment, the hook 78 may be positioned on the exterior side wall 82 of the second braking member 54. The hook 78 may allow for a strap, carrying band, carabiner clip, or similar object (not viewed) to attach to the braking device 50 to securely store the braking device 50 when not in locking operational use in an assembled position of the braking device 50, or in a disassembled position of the braking device 50. For example, the hook 78 may allow the braking device 50, or at least the first or second braking member 52 or 54, to hang from an item, such as luggage or a backpack, or from the mobile unit itself when the end user is not in need of a locking operation to secure movement of the mobile unit. While the hook 78 is illustrated on the exterior side wall 82 of the second braking member 54, it is envisioned by the inventors that the hook 78 can be positioned on the first braking member 52, or any other braking member if there are additional braking members. It is also envisioned that the location of the hook 78 need not be confined to the exterior side wall 82 of any braking member 52 or 54 and that the hook 78 can alternatively be positioned and functionally placed one on either a top surface wall 84 or an interior side wall 80 of either the first or second braking member 52 or 54 or any additional braking members or design configurations with braking members used to create the braking device 50.

Figure 9:
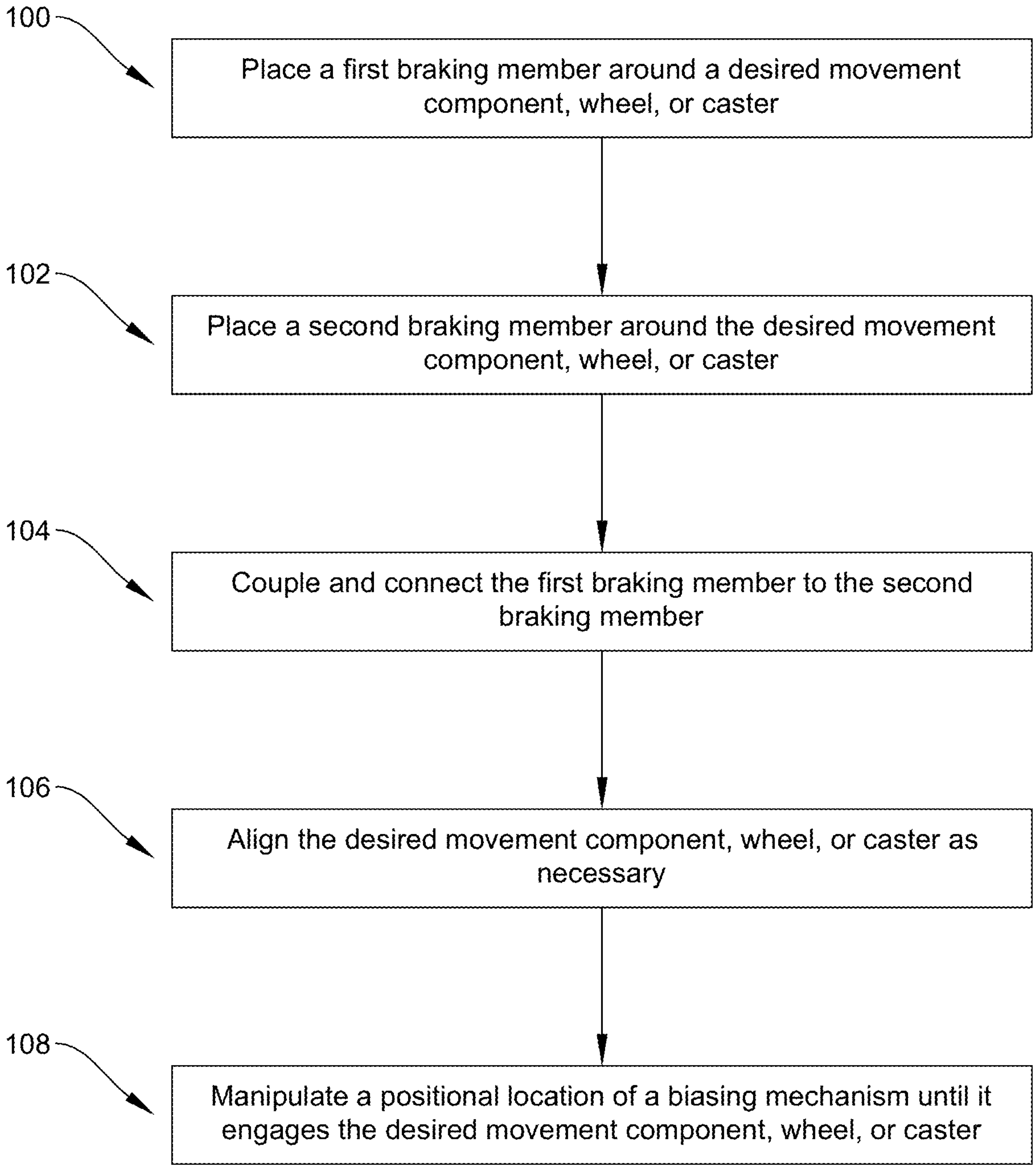
FIG. 9 illustrates a flowchart for assembling the example braking device around a movement feature of a mobile unit to deploy the braking device in a securing position in accordance with an embodiment of the disclosure.

Turning now to FIG. 9, a flowchart is viewed illustrating the operative steps that may be possible and completed by an end user to place the braking device 10 or 50 from an unassembled configuration to an assembled configuration. The flowchart of FIG. 9 further illustrates use of the braking device 10 or 50 by the end user to place the braking device 10 or 50 into a locking position or locking operations to secure a movement component, wheel, caster, or the like of a mobile unit thereby prohibiting further unwanted movement of the mobile unit. In operational use of the braking device 10 or 50, the end user may be desirous to maintain a consistent location, or to lock a specific positional orientation, of a mobile unit such as a piece of luggage. The mobile unit may have at least one movement component, wheel, caster, or the like that can be secured by the braking device 10 or 50. To begin the operational use process, and viewed in block 100, the end user may initially place the first braking member 12 or 52 around at least one movement component, wheel, caster, or the like of a mobile unit. This initial placement of the first braking member 12 or 52 allows the end user to select the optimal movement component, wheel, caster, or the like from multiple movement components that may be present on the mobile unit to best prohibit further unwanted movement of the overall mobile unit. Next, in block 102 the end user can place the second braking member 14 or 54 in a positional location opposite the location of the first braking member 12 or 52, and generally around the movement component, wheel, caster, or the like to be secured by the braking device 10 or 50. Placement of each the first braking member 12 or 52 and the second braking member 14 or 54 in these locations generally creates the confinement zone 13 in which the movement component, wheel, caster, or the like will be secured by the braking device 10 or 50. Then, in block 104, the end user may connect and couple together the first braking member 12 or 52 and the second braking member 14 or 54 to create the confinement zone 13 with the movement component, wheel, caster, or the like being contained within confinement zone 13. In some embodiments, the connection and coupling together the first braking member 12 or 52 and the second braking member 14 or 54 may be accomplished by the alignment extensions 26 or 66 fitting into respective alignment bores 28 or 68 and through use of the magnetic forces and fields emitted by the plurality of magnets 24 or 64 and their respective positionings within each or either the first braking member 12 or 52 or second braking member 14 or 54.

If necessary, in step 106, the end user may then align the assembled braking device 10 or 50 created by the coupling connection between the first braking member 12 or 52 and the second braking member 14 or 54. Alignment of the assembled braking device 10 or 50 ensures that the movement component, wheel, caster, or the like is in the optimal location within the confinement zone 13 so that the assembled braking device 10 or 50 can be transitioned from the unlocked position to a locking position to securely hold the movement component, wheel, caster, or the like within the confinement zone 13. Finally, in step 108, the end user can manipulate the positional location of the biasing mechanism 32 or 72 to secure the movement component, wheel, caster, or the like securely within the confinement zone 13.

Changing or adjusting the positional location of the biasing mechanism 32 or 72 may be accomplished in various ways as disclosed and discussed above. For example, the end user may rotate the biasing mechanism 32 or 72 to move the biasing mechanism 32 or 72 further into the confinement zone 13. If the biasing mechanism 32 or 72 is threaded, and a threaded biasing bore 34 or 76 is used by the braking device 10 or 50, rotation of biasing mechanism 32 or 72 in the correct rotational direction will move biasing mechanism 32 or 72 further into the confinement zone 13 by way of the threaded connection between the biasing mechanism 32 or 72 and the threaded biasing bore 34 or 76. Ultimately, the end user's movements to adjust and change the positional location of the biasing mechanism 32 or 72 may result in an end or end component (such as end plate 70) of the biasing mechanism 32 or 72 within the confinement zone 13 to engage with a first movement component side 40 of the movement component 41, wheel, caster, or the like. Engagement of the end or end component (such as end plate 70) of the biasing mechanism 32 or 72 with the first movement component side 40 of the movement component 41, wheel, caster, or the like, frictionally secures the movement component, wheel, caster, or the like between each the end or end component (such as end plate 70) of the biasing mechanism 32 or 72 and a side wall portion 44 of either the first or second braking member 12, 14, 52, or 54 of the braking device 10 or 50 engaging a second movement component side 42 of the movement component, wheel, caster, or the like.

Figure 10:
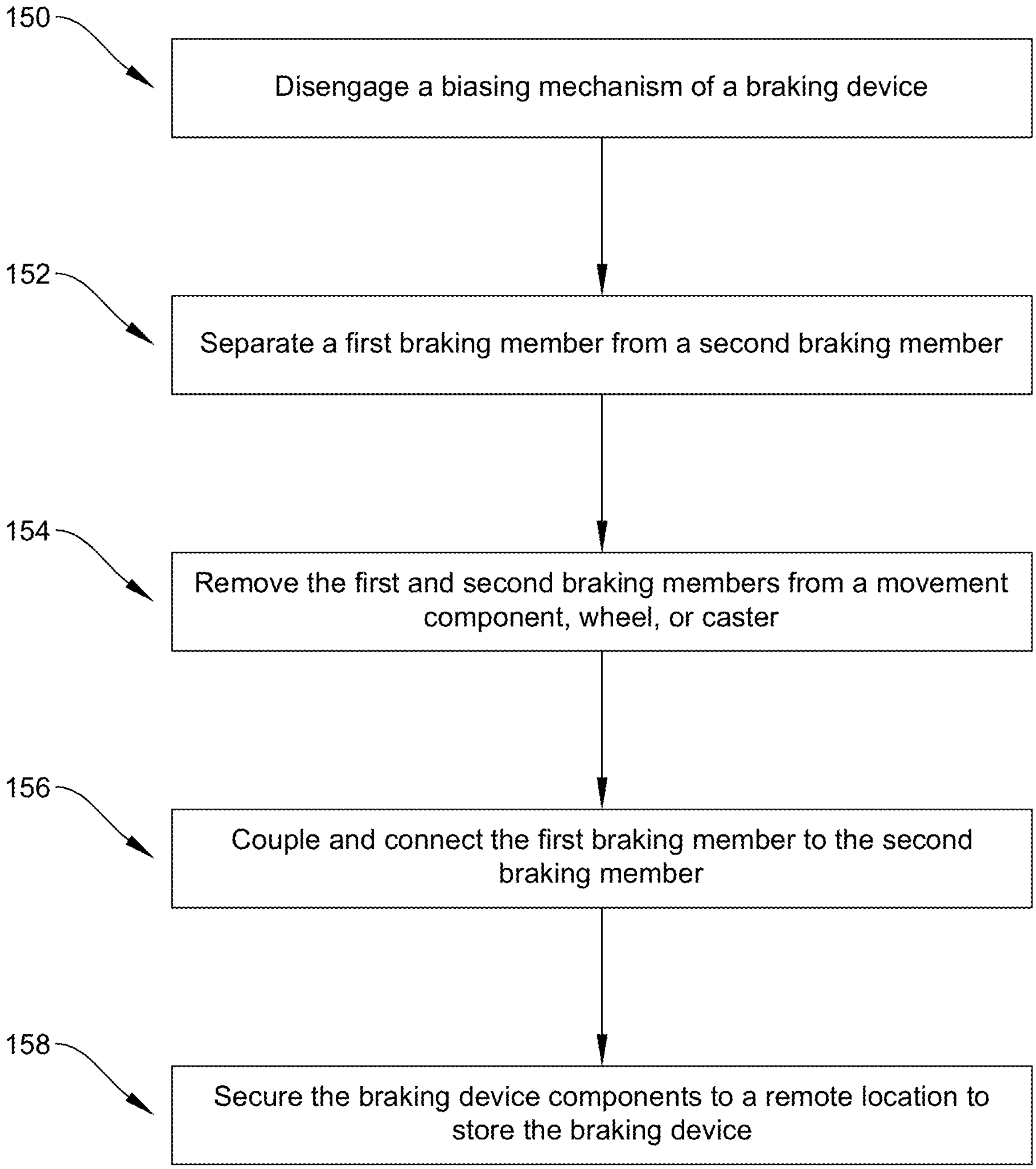
FIG. 10 illustrates a flowchart for disengaging and disassembling the example braking device from a securing position deployed on a movement feature of a mobile unit in accordance with an embodiment of the disclosure.

In FIG. 10, a flowchart is viewed illustrating the operative steps that may be possible and completed by an end user to operationally change use of the braking device 10 or 50 from a locking position or locking operation to an unlocked position or unlocking operation to release a previously secured movement component, wheel, caster, or the like of a mobile unit. Such an operational change will allow the end user to then freely move the overall mobile unit when desired. The flowchart of FIG. 10 further illustrates adjusting use of the braking device 10 or 50 between assembled and disassembled positions of the overall device based on the wishes of the end user. Finally, the flowchart of FIG. 10 illustrates placing the braking device 10 or 50 in at least one envisioned and possible storage position so that the end user can quickly retrieve and use the braking device 10 or 50 when it is needed again in a different operational formation.

The operational flowchart of FIG. 10 begins at step 150 where the end user may disengage the biasing mechanism 32 or 72. This may occur when the end user is ready to change physical locations with the mobile unit, such as luggage, and wishes to do so with movement use of the previously secured movement component, wheel, caster, or the like of a mobile unit. To disengage the biasing mechanism 32 or 72, the end user can, for example, manipulate the positional location of the biasing mechanism 32 or 72. Manipulation of the positional location of the biasing mechanism 32 or 72, may remove any engagement of an end or end component (such as end plate 70) of the biasing mechanism 32 or 72 with a first movement component side 40 of the movement component, wheel, caster, or the like, that was in previous communication to frictionally secure the movement component, wheel, caster, or the like between each the end or end component (such as end plate 70) of the biasing mechanism 32 or 72 and a side wall portion 44 of either the first or second braking member 12, 14, 52, or 54 of the braking device 10 or 50. Further, manipulation of the positional location of the biasing mechanism 32 or 72 removes any engagement of the second movement component side 42 of the movement component 41, wheel, caster, or the like and a side wall portion 44 of either the first or second braking member 12, 14, 52, or 54 of the braking device 10 or 50 that is opposite the location of the end or end component (such as end plate 70) of the biasing mechanism 32 or 72 previously in communicative engagement with the first movement component side 40 of the movement component 41, wheel, caster, or the like.

Next, in block 152, the end user can then disassemble the braking device 10 or 50 by separating its component pieces from one another that when combined together create the confinement zone 13 in which the movement component 41, wheel, caster, or the like was previously secured. At this point, the end user may disconnect any couplings between the first braking member 12 or 52 and the second braking member 14 or 54 that previously surrounded the movement component 41, wheel, caster, or the like being contained within the previously created confinement zone 13. Then, in block 154, each of the first braking member 12 or 52 and the second braking member 14 or 54 may be removed from their positions opposite one another and lifted from contact with the ground surface. In some envisioned embodiments, the end user can then store the first braking member 12 or 52 and the second braking member 14 or 54 individually in a common or separate locations until later use of the braking device 10 or 50 is needed.

Alternatively, and as viewed in block 156, the end user may reattach, connect, or couple together the first braking member 12 or 52 and the second braking member 14 or 54 at a remote location to create the confinement zone 13. The reattachment of the first braking member 12 or 52 and the second braking member 14 or 54 at the remote location may occur in block 156 without any type of movement component 41, wheel, caster, or the like being located or contained within confinement zone 13. As stated and discussed above, the reattachment, connection, or coupling together of the first braking member 12 or 52 and the second braking member 14 or 54 may be accomplished by the alignment extensions 26 or 66 fitting into respective alignment bores 28 or 68 and through use of the magnetic forces and fields emitted by the plurality of magnets 24 or 64 and their respective positionings within each or either the first braking member 12 or 52 or second braking member 14 or 54. Finally, in block 158, the end user can place the remotely assembled braking device 10 or 50 in a storage position and a storage location for later use. In one possible storage position or storage location, the end user may utilize a carrying band 38, strap, or a storage connector of the like to operatively connect with or hang the assembled braking device 10 or 50 from an item, such as the luggage or another mobile unit that may be secured later by the braking device 10 or 50. While keeping the assembled braking device 10 or 50 near the end user, the end user can quickly redeploy the braking device 10 or 50 as needed on mobile unit to which the braking device 10 or 50 is connectively stored or another mobile unit depending on the needs of the end user.

The embodiments presented and disclosed above were chosen and described in order to best explain the principles of the invention, and its practical application, to thereby enable others skilled in the art to best utilize the invention in various embodiments and with various modifications as are suited to the particular use contemplated.

As various modifications could be made in the construction and methods herein described and illustrated without departing from the scope of the invention, it is intended that all matter contained in the foregoing description or shown in the accompanying drawings shall be interpreted as illustrative rather than limiting. For example, the design, structure, or configuration of the braking device, the number and amount of coupling and connecting means possible between various braking members of the braking device, and alternative features and options of the braking device for easier deployment and storage may be employed but can achieve the same functionality of the underlying invention. Thus, the breadth and scope of the present disclosure should not be limited by any of the above-described example embodiments but should be defined only in accordance with the following claims appended hereto and their equivalents.

What is claimed is:

1. A braking device comprising:

a first braking member having first and second attachment faces, at least one of the first and second attachment faces having a coupling bore, the first and second attachment faces being located at end sections of the first braking member;

a second braking member having first and second attachment faces, at least one of the first and second attachment faces having a coupling bore, the first and second attachment faces being located at end sections of the second braking member;

a frictional material coupled to at least a portion of either the first braking member or the second braking member;

a confinement zone to house a movement component of a mobile unit;

a plurality of magnets;

a first alignment extension projecting outward from the first attachment face of the first braking member;

a second alignment extension projecting outward from second attachment face of the first braking member;

a first alignment bore recessed in the first attachment face of the second braking member;

a second alignment bore recessed in the second attachment face of the second braking member;

wherein the first braking member is removably attached to the second braking member to create the confinement zone and house the movement component of the mobile unit;

wherein the plurality of magnets is positioned at least partially within the coupling bore of the at least one of the first attachment face and the second attachment face of the first braking member and within the coupling bore of the at least one of the first attachment face and the second attachment face of the second braking member; and wherein the first alignment extension releasably engages with the first alignment bore, and the second alignment extension releasably engages with the second alignment bore to create the confinement zone of the braking device.

2. The braking device of claim 1, wherein each of the first alignment extension, the first alignment bore, the second alignment extension, and the second alignment bore are centrally positioned on their respective attachment faces of each the first braking member and the second braking member.

3. The braking device of claim 1, wherein the frictional material is further coupled to at least portions of each the first braking member and the second braking member, the frictional material being coupled to a surface contacting portion of each the first braking member and the second braking member.

4. The braking device of claim 1, wherein the frictional material has a higher frictional coefficient when contacting a ground surface than a surface contacting portion of the first braking member or the second braking member onto which the frictional material is coupled.

5. The braking device of claim 1, wherein the first braking member and second braking member project a U-shaped configuration.

6. A braking device comprising:

a first braking member;

a second braking member, the second braking member being removably attachable to the first braking member;

a first alignment extension projecting outward from a first attachment face of the first braking member;

a second alignment extension projecting outward from a first attachment face of the second braking member;

a first alignment bore being recessed in a second attachment face of first braking member;

a second alignment bore being recessed in a second attachment face of the second braking member;

the first alignment extension being releasably engaged with the second alignment bore and the second alignment extension being releasably engaged with the first alignment bore when the second braking member is removably attached to the first braking member;

a biasing mechanism, the biasing mechanism positioned and movable through either the first braking member or the second braking member;

a confinement zone to house a movement component of a mobile unit, the confinement zone formed when the first braking member is removably attached with the second braking member; and wherein the biasing mechanism is movable between a first position and a second position, the first position placing the biasing mechanism further away from the confinement zone and the second position placing the biasing mechanism further within the confinement zone for selective contact with the movement component of the mobile unit.

7. The braking device of claim 6, wherein the biasing mechanism has a first end and a second end, the first end of the biasing mechanism located outside of the confinement zone and the second end of the biasing mechanisms located within the confinement zone.

8. The braking device of claim 7, wherein the second end of the biasing mechanism engages a first movement component side of the movable component when the biasing mechanism is placed in the second position.

9. The braking device of claim 8, wherein a second movement component side of the movable component engages a side wall of either the first braking member or the second braking member to secure the movable component between the side wall and the second end of the biasing mechanism in the second position.

10. The braking device of claim 9, wherein the first braking member and second braking member are attached with a greater force than a force exerted by the biasing mechanism against the movement component to secure the movable component between the side wall and the second end of the biasing mechanism in the second position.

11. The braking device of claim 7, wherein the second end of the biasing mechanism has an end plate, the end plate in operative connection with the second end and capable of engaging a first movement component side of the movable component when the biasing mechanism is placed in the second position.

12. The braking device of claim 11, wherein the end plate has a textured surface made of a malleable material so that placement of the biasing mechanism in the second position minimally deforms and spreads the textured surface of the end plate to increase the surface area of the end plate in contact with the first movement component side of the moveable component.

13. The braking device of claim 6, wherein the biasing mechanism has a threaded configuration and either the first braking member or the second braking member has a biasing bore with a corresponding threaded configuration to receive the biasing mechanism, the biasing mechanism positioned and movable through the biasing bore present on either the first braking member or the second braking member via a threaded connection achieved by the threaded configuration of the biasing mechanism operatively secured within the biasing bore having the corresponding threaded configuration.

14. The braking device of claim 13, wherein the biasing mechanism has a first end and a second end, the first end of the biasing mechanism located outside of the confinement zone and the second end of the biasing mechanism located within the confinement zone; and a knob present on the biasing mechanism in operative connection with the first end, the knob having a larger surface area than the first end of the biasing mechanism, and the knob capable of rotational movement to adjust the location of the biasing mechanism via the threaded connection between the first position and the second position.

15. The braking device of claim 6, further comprising:

a hook located on either the first braking member or the second braking member, the hook useable to assist in placing the braking device into a storage position; and a carrying band coupled to the hook.

16. The braking device of claim 6, wherein the first braking member and second braking member project a U-shaped configuration.

17. The braking device of claim 6, wherein the biasing mechanism has a locking nut.

18. A method to secure a movable component of a mobile unit with a braking device, the method comprising:

placing a first braking member of the braking device around the movable component, wherein the movable component is located within a confinement zone of the braking device wherein the first braking member has an alignment extension projecting outward from a first attachment face of the first braking member and an alignment bore being recessed in a second attachment face of first braking member;

placing a second braking member around the movable component at a location opposite the first braking member wherein the second braking member has an alignment extension projecting outward from a first attachment face of the second braking member and an alignment bore being recessed in a second attachment face of second braking member;

attaching the first braking member to the second braking member by releasably engaging the alignment extension projecting outward from the first attachment face of the first braking member with the alignment bore recessed into the second attachment face of the second braking member and releasably engaging the alignment extension projecting outward from the first attachment face of the second braking member with the alignment bore recessed in the second attachment face of the first braking member to create the confinement zone surrounding the movable component;

adjusting a biasing mechanism operatively coupled through either the first braking member or the second braking member, the biasing mechanism having a portion present within the confinement zone of the braking device; and wherein adjustment of the biasing mechanism moves a positional location of the biasing mechanism further into the confinement zone towards the moveable component until engagement with a first movement component side of the movable component to secure the moveable component within the confinement zone of the braking device.

19. The method of claim 18, wherein the adjusting step further includes a first end of the biasing mechanism located outside the confinement zone;

a second end of the biasing mechanism located within the confinement zone;

a threaded connection to operatively couple the biasing mechanism with a biasing bore through either the first braking member or the second braking member; and wherein rotational movement of the first end of the biasing mechanism facilitates adjustment of the positional location of the biasing mechanism, via the threaded connection, both further into the confinement zone to help secure the movable component via the second end of the biasing mechanism, or further away from the confinement zone to help release any previously secured movable component within the confinement zone.

* * * * *